United States Patent
Li

(10) Patent No.: US 11,498,580 B2
(45) Date of Patent: Nov. 15, 2022

(54) METHOD AND DEVICE FOR FACILITATING MANUAL OPERATION OF A VEHICLE

(71) Applicant: Verizon Patent and Licensing Inc., Arlington, VA (US)

(72) Inventor: Wei Li, Selwyn District (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 211 days.

(21) Appl. No.: 16/444,569

(22) Filed: Jun. 18, 2019

(65) Prior Publication Data

US 2020/0398861 A1 Dec. 24, 2020

(51) Int. Cl.
| | |
|---|---|
| *B60W 50/10* | (2012.01) |
| *B60Q 9/00* | (2006.01) |
| *B60W 50/14* | (2020.01) |
| *G07C 5/08* | (2006.01) |

(52) U.S. Cl.
CPC .............. *B60W 50/10* (2013.01); *B60Q 9/00* (2013.01); *B60W 50/14* (2013.01); *G07C 5/085* (2013.01); *B60W 2050/146* (2013.01); *B60W 2420/42* (2013.01); *B60W 2420/52* (2013.01); *B60W 2420/54* (2013.01); *B60W 2520/06* (2013.01); *B60W 2520/10* (2013.01); *B60W 2520/105* (2013.01); *B60W 2540/10* (2013.01); *B60W 2540/12* (2013.01); *B60W 2540/14* (2013.01); *B60W 2540/18* (2013.01); *B60W 2540/30* (2013.01); *B60W 2555/60* (2020.02); *B60W 2556/60* (2020.02)

(58) Field of Classification Search
CPC ...... B60W 50/10; B60W 50/14; B60W 50/16; B60W 50/08; B60W 50/085; B60W 50/087; B60W 2050/143; B60W 2050/146; B60W 2420/52; B60W 2420/54; B60W 2420/42; B60W 2520/10; B60W 2520/105; B60W 2520/06; B60W 2540/043; B60W 2540/10; B60W 2540/12; B60W 2540/14; B60W 2540/18; B60W 2540/30; B60W 2555/60; B60W 2556/60; B60W 2556/55; B60W 2556/50; G07C 5/0841; G07C 5/085

See application file for complete search history.

(56) References Cited

U.S. PATENT DOCUMENTS

| | | | | |
|---|---|---|---|---|
| 7,124,027 | B1 * | 10/2006 | Ernst, Jr. ............... | B60W 30/09 |
| | | | | 701/301 |
| 9,067,565 | B2 * | 6/2015 | McClellan ........... | G07C 5/0841 |
| 9,586,591 | B1 * | 3/2017 | Fields .................. | B60W 40/09 |

(Continued)

*Primary Examiner* — Russell Frejd
*Assistant Examiner* — Brandon Z Willis

(57) ABSTRACT

A processing platform may obtain sensor data associated with a vehicle and manual input data associated with the vehicle. The processing platform may determine, based on the sensor data, automated control information. The processing platform may determine, based on the sensor data and the manual input data, a parameter associated with the vehicle. The processing platform may determine, based on the automated control information, a control rating associated with the parameter. The processing platform may determine whether the control rating satisfies a threshold for a period of time. The processing platform may cause, based on determining that the control rating satisfies the threshold for the period of time, at least one action to be performed.

20 Claims, 9 Drawing Sheets

(56) References Cited

U.S. PATENT DOCUMENTS

| | | | | |
|---|---|---|---|---|
| 9,615,213 | B2* | 4/2017 | Tibbitts | B60T 8/172 |
| 10,023,114 | B2* | 7/2018 | Adams | B60Q 9/00 |
| 10,300,922 | B2* | 5/2019 | Volos | G07C 5/008 |
| 2017/0110021 | A1* | 4/2017 | Skagius | B60W 50/14 |
| 2019/0383627 | A1* | 12/2019 | Nangeroni | G01C 21/3461 |
| 2020/0074492 | A1* | 3/2020 | Scholl | B60K 35/00 |

* cited by examiner

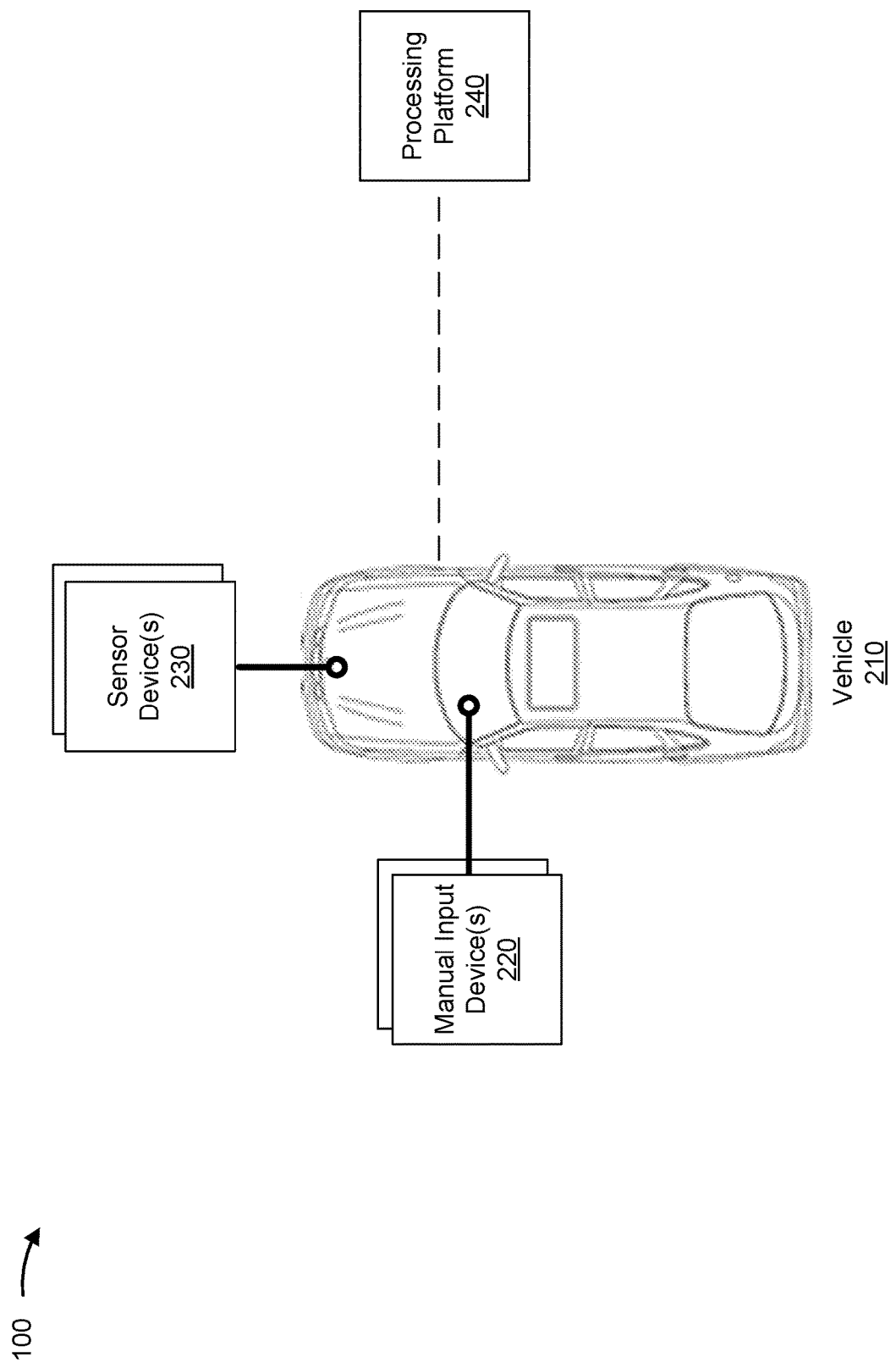

106
Determine automated control information

108
Determine a parameter associated with the vehicle, such as:
- a speed of the vehicle
- an acceleration of the vehicle
- a deceleration of the vehicle
- a direction of a steering device of the vehicle
- a status of an accelerator pedal of the vehicle
- a status of a brake pedal of the vehicle
- a status of a clutch pedal of the vehicle
- a path of the vehicle
- a position of the vehicle with respect to a driving lane
- environmental information associated with the vehicle

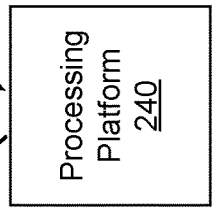

Processing Platform
240

METHOD AND DEVICE FOR FACILITATING MANUAL OPERATION OF A VEHICLE

BACKGROUND

A sensor device can be mounted to a vehicle to capture sensor data, such as a speed of the vehicle, an acceleration or deceleration of the vehicle, a path of the vehicle, an orientation of the vehicle and/or the like.

BRIEF DESCRIPTION OF THE DRAWINGS

FIGS. 1A-1F are diagrams of example implementations described herein.

DETAILED DESCRIPTION OF PREFERRED EMBODIMENTS

Figure 1B:
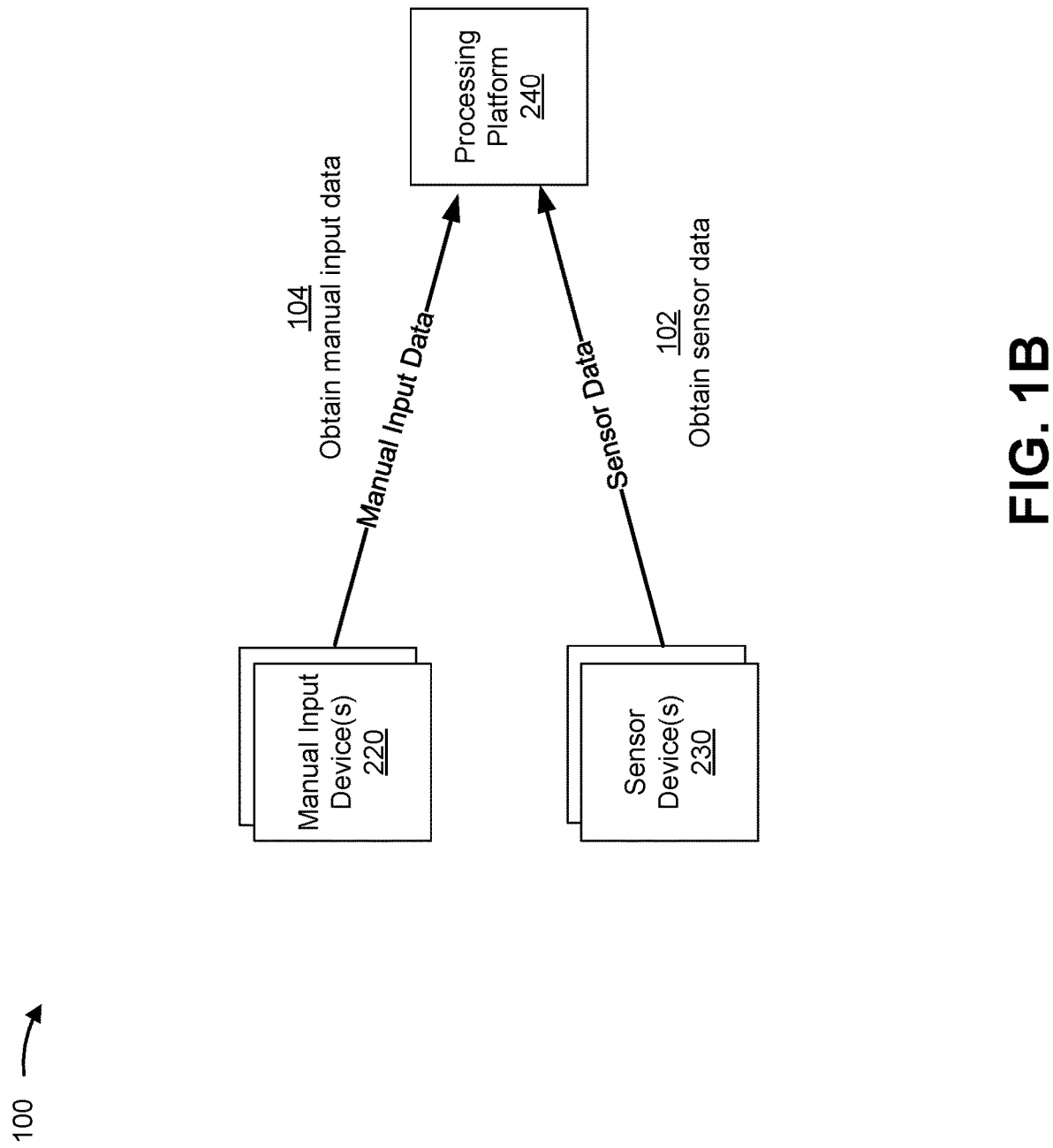

The following detailed description of example implementations refers to the accompanying drawings. The same reference numbers in different drawings may identify the same or similar elements.

A vehicle may have one or more sensor devices that produce sensor data that can be used to automatically control the vehicle (e.g., a controller processes the sensor data to generate automated control information). However, in many cases, the vehicle may still be manually controlled by an operator (e.g., a driver of the vehicle). In some cases, the operator of the vehicle may operate the vehicle to behave in a way that deviates from how the vehicle would behave if it were automatically controlled (e.g., by the controller). The operator's operation of the vehicle may cause a dangerous event (e.g., an accident) that harms the operator of the vehicle and/or other people and/or that damages the vehicle or other property. Further, in some cases, a monitoring device, such as a camera device) may be used to continuously monitor the operator of the vehicle to assist in evaluating the operator's operation of the vehicle. The operator may find the additional device to be obtrusive and/or offensive, which may affect the operator's operation of the vehicle. Furthermore, the monitoring device may require continuous use of resources (e.g., memory resources, processing resources, power resources, communication resources, and/or the like) to monitor the operator.

Some implementations described herein provide a processing platform that is capable of facilitating manual operation of a vehicle. In some implementations, the processing platform may obtain sensor data associated with a vehicle and manual input data associated with the vehicle. In some implementations, the processing platform may determine, based on the sensor data, automated control information and may determine, based on the sensor data and the manual input data, a parameter associated with the vehicle. In some implementations, the processing platform may determine, based on the automated control information, a control rating associated with the parameter and may determine whether the control rating satisfies a threshold for a period of time. In some implementations, the processing platform may cause, based on determining that the control rating satisfies the threshold for the period of time, at least one action to be performed (e.g., providing an alert to a display of the vehicle).

In this way, the processing platform can monitor and analyze operation of a vehicle (e.g., during or after the vehicle is operated by an operator of the vehicle) based on a control rating and can cause an action to be performed that facilitates manual operation of the vehicle. This can facilitate passively and unobtrusively determining a fitness of an operator to operate the vehicle (e.g., determining whether the operator exhibits non-preferred driving behavior without using a monitoring device to directly monitor the operator). Moreover, this may eliminate a need for the monitoring device, which may eliminate a demand for resources (e.g., memory resources, processing resources, power resources, communication resources, and/or the like) that would otherwise be used to monitor the operator. Moreover, the processing platform may cause an action to be performed that reduces a likelihood that the operator will cause a dangerous event to occur while operating the vehicle, which may reduce a likelihood that the operator of the vehicle and/or other people are harmed and/or that the vehicle or other property are damaged. This may reduce a demand for resources that would otherwise be used to tend to injured people and/or repair damaged property.

FIGS. 1A-1F are diagrams of an example implementation 100 described herein. As shown in FIG. 1A, example implementation(s) 100 may include a vehicle (shown as vehicle 210 and described herein in relation to FIG. 2), one or more manual input devices (shown as manual input device(s) 220 and described herein in relation to FIG. 2), one or more sensor devices (shown as sensor device(s) 230 and described herein in relation to FIG. 2), a processing platform (shown as processing platform 240 and described herein in relation to FIG. 2), and/or the like. The one or more manual input devices, the one or more sensor devices, and/or the like of the processing platform may be included in vehicle 210. Additionally, or alternatively, the processing platform may be outside vehicle 210. In some implementations, the vehicle, the one or more manual input devices, the one or more sensor devices, and/or the processing platform may communicate with each other using a wired connection, a wireless connection, or a combination of wired and wireless connections. For example, when the processing platform is not included in the vehicle, the vehicle, the one or more manual input devices, and/or the one or more sensor devices may communicate with the processing platform via a cellular connection, such as a 3G connection, a 4G connection, a long term evolution (LTE) connection, a 5G connection, and/or the like. As another example, when the processing platform is included in the vehicle, the one or more manual input devices, the one or more sensor devices, and/or the processing platform may communicate via a wired connection.

The one or more sensor devices may include a speedometer device, a tachometer device, an accelerometer device, a radar device, a sonar device, a camera device, a light detection and ranging (lidar) device, an inertial positioning system device, a global positioning system (GPS) device, and/or the like. The one or more sensor devices may generate sensor data (e.g., data that indicates an acceleration or deceleration of the vehicle, a speed of the vehicle, a path of the vehicle, a position of the vehicle (e.g., with respect to a driving lane), and/or the like) when an operator (e.g., a driver) manually operates the vehicle. The one or more manual input devices may include a steering device (e.g., a steering wheel), an accelerator pedal, a brake pedal, a clutch pedal, and/or the like. The one or more manual input devices may generate manual input data (e.g., one or more manual input instructions to operate the vehicle). For example, the operator of the vehicle may interact with the one or more manual input devices, which may cause the one or more manual input devices to generate the manual input data that controls the vehicle.

As shown in FIG. 1B and by reference number 102, the processing platform may obtain the sensor data from the one or more sensor devices. For example, the one or more sensor devices may send the sensor data to the processing platform and/or the processing platform may request and receive the sensor data from the one or more sensor devices. As shown by reference number 104, the processing platform may obtain the manual input data from the one or more manual input devices. For example, the one or more manual input devices may send the manual input data to the processing platform and/or the processing platform may request and receive the manual input data from the one or more manual input devices. The processing platform may obtain the sensor data and/or the manual input data in real-time (e.g., the processing platform may obtain the sensor data and/or the manual input data as the sensor data is generated and/or the manual input data is generated).

As shown in FIG. 1C and by reference number 106, the processing platform may determine automated control information. The automated control information may include one or more automated control instructions for controlling the vehicle (e.g., one or more driving instructions for automatically driving the vehicle). The one or more automated control instructions, when executed by the vehicle, may affect the one or more manual input devices (e.g., adjust the steering device, engage and/or disengage the accelerator pedal, the brake pedal, and/or the clutch pedal, and/or the like).

In some implementations, the processing platform may determine the automated control information based on the sensor data. For example, the processing platform may process the sensor data to determine a speed of the vehicle, an acceleration or deceleration of the vehicle, a path of the vehicle, a position of the vehicle (e.g., with respect to a driving lane), and/or the like. The processing platform may determine the automated control information based on the speed of the vehicle, the acceleration or deceleration of the vehicle, the path of the vehicle, the position of the vehicle, and/or the like determined by the processing platform. For example, the processing platform may determine one or more automated control instructions to engage or disengage the accelerator pedal based on the speed of the vehicle. As another example, the processing platform may determine one or more automated control instructions to adjust the steering wheel a particular amount (e.g., in degrees) based on the path of the vehicle and/or the position of the vehicle.

As shown by reference number 108, the processing platform may determine a parameter associated with the vehicle (e.g., related to operation of the vehicle) based on the sensor data and/or the manual input data. For example, the processing platform may process the sensor data to determine a speed of the vehicle, an acceleration or deceleration of the vehicle, a path of the vehicle, a position of the vehicle (e.g., with respect to a driving lane), environmental information associated with the vehicle, such as a distance from the vehicle to an object (e.g., another vehicle, a person, a median, a building, a sign, and/or the like), and/or the like. Additionally, or alternatively, the processing platform may process the manual input data to determine a direction of a steering device of the vehicle, a status of an accelerator pedal of the vehicle, a status of a brake pedal of the vehicle, a status of a clutch pedal of the vehicle, and/or the like.

Figure 1D:
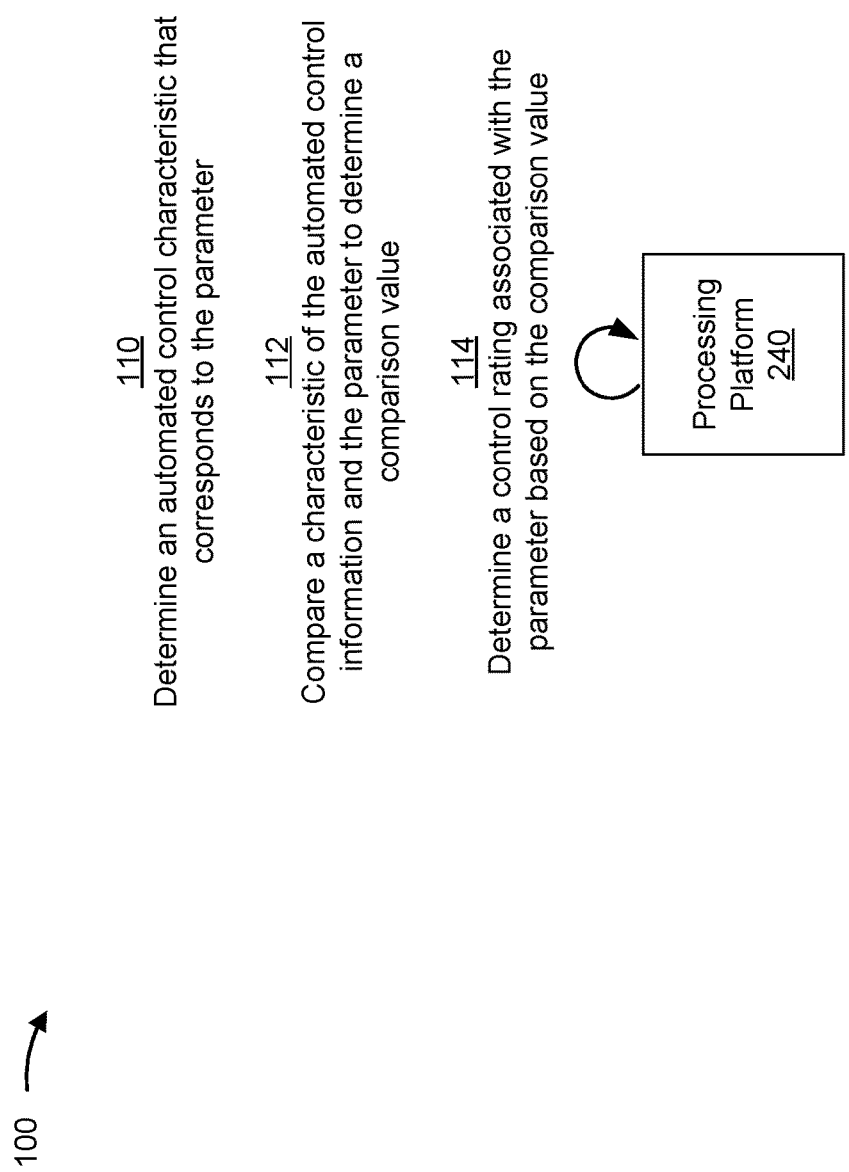

As shown in FIG. 1D and by reference number 110, the processing platform may process the automated control information to determine an automated control characteristic that corresponds to the parameter. For example, when the parameter is the speed of the vehicle (e.g., the parameter may indicate that the speed of the vehicle is 20 miles per hour), the processing platform may process at least one of the one or more automated control instructions included in the automated control information to determine an automated control characteristic related to speed (e.g., the automated control characteristic may indicate a preferable speed of the vehicle to be 30 miles per hour). The automated control characteristic may indicate a preferable value concerning the parameter.

As shown by reference number 112, the processing platform may determine a comparison value. The processing platform may compare the automated control characteristic and the parameter to determine the comparison value. For example, when the parameter indicates a speed of the vehicle to be 35 miles per hour and the automated control characteristic indicates a preferable speed of the vehicle to be 25 miles per hour, the comparison value may be the difference in speed indicated by the parameter and the automated control characteristic (e.g., 10 miles per hour). As another example, when the parameter indicates a leftward position of the vehicle (e.g., with respect to a driving lane, such as a lane on a road indicated by white or yellow pavement lines), and the automated control characteristic indicates a preferable position of the vehicle to be a central position, the comparison value may be the difference in position indicated by the parameter and the automated control characteristic (e.g., the difference between the leftward position and the central position measured in feet, meters, and/or the like).

Additionally, or alternatively, the processing platform may determine one or more particular manual input instructions, of the one or more manual input instructions, that are associated with the parameter and may determine one or more particular automated control instructions, of the one or more automated control instructions, associated with the parameter. The processing platform may determine a comparison value associated with the parameter based on the one or more particular automated control instructions and the one or more particular manual input instructions. For example, when the one or more particular manual input instructions indicate a particular direction associated with the path of the vehicle and the one or more particular automated control instructions indicate a preferable direction for the path of the vehicle, the comparison value may be a difference in the direction indicated by the one or more particular manual input instructions and the one or more particular automated control instructions (e.g., measured in degrees).

As shown by reference number 114, the processing platform may determine a control rating associated with the parameter based on the comparison value. The control rating may indicate whether and/or to what degree the parameter and/or the automated control characteristic are similar. The processing platform may process the comparison value, using a normalizing function associated with the parameter, to determine the control rating. For example, for a particular parameter, the processing platform may process the comparison value using a particular normalizing function to generate a control rating that has a value between 0 and 1 (e.g., the control rating is greater than or equal to 0 or less than or equal to 1). In this example, a control rating value of 0 indicates that the parameter and the automated control characteristic are the same, a control rating value closer to 0 (e.g., the control rating value is less than 0.5) indicates that the parameter and the automated control characteristic are similar, a control rating value closer to 1 (e.g., the control rating value is greater than or equal to 0.5) indicates that the parameter and the automated control characteristic are not similar, and a control rating value of 1 indicates that the parameter and the automated control characteristic are contrary to each other (e.g., the parameter indicates acceleration and the automated control characteristic indicates deceleration; the parameter indicates a rightward turn and the automated control characteristic indicates a leftward turn; and/or the like). The processing platform may process the comparison value using any type of normalizing function to generate the control rating.

Figure 1E:
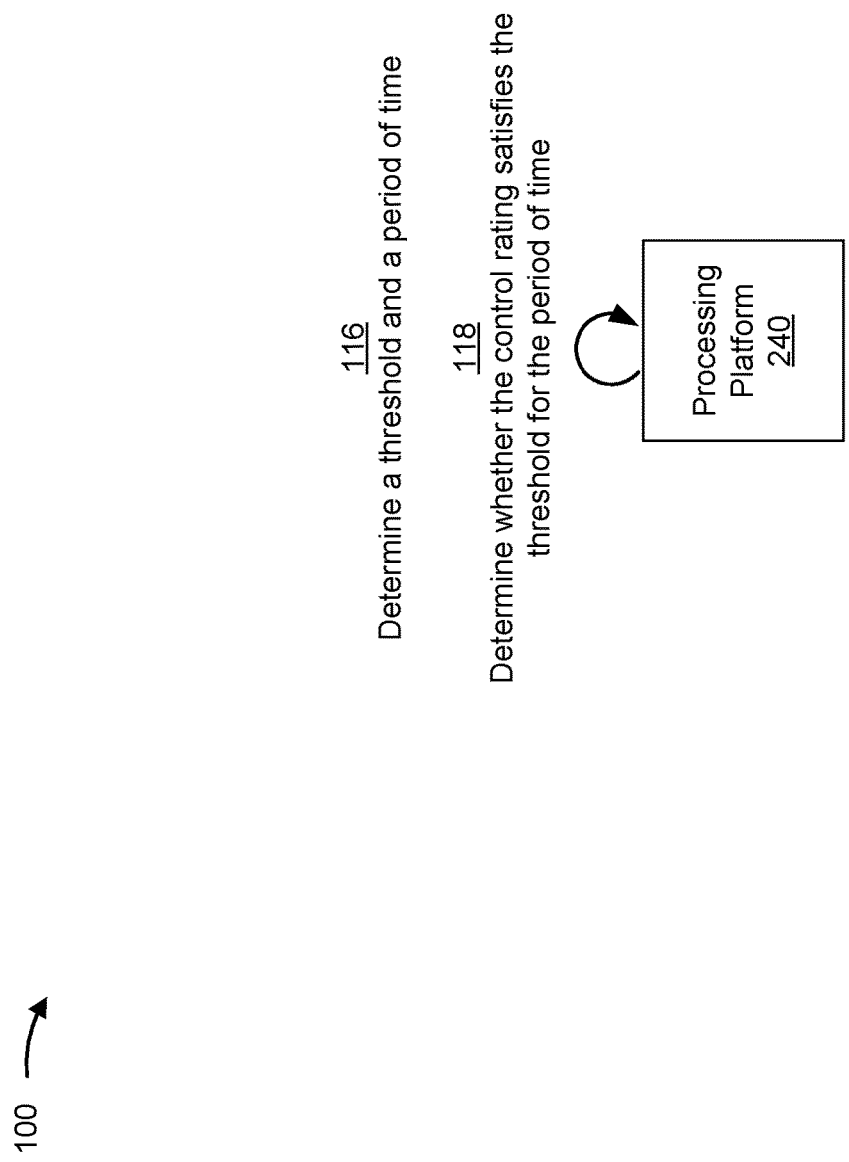

As shown in FIG. 1E and by reference number 116, the processing platform may determine a threshold and/or a period of time. The threshold and the period of time may be utilized by the processing platform to determine when to perform at least one action (as described herein in relation to FIG. 1F). The processing platform may obtain (e.g., from the vehicle or another device, such as a server device) identification information concerning a driver of the vehicle and/or identification information concerning an organization associated with the vehicle (e.g., a fleet manager of the vehicle). The processing platform may determine the threshold and the period of time based on the identification information concerning the driver and/or the identification information concerning the organization. Additionally, or alternatively, the processing platform may identify information concerning a driving preference of the driver and/or may identify information concerning a driving preference of the organization. The processing platform may determine the threshold and the period of time based on the information concerning the driving preference of the driver and/or the information concerning the driving preference of the organization. For example, the processing platform may obtain identification information concerning a driver of the vehicle, may determine and/or identify that the driver prefers a minimal quantity of alerts based on the identification information, and may set the threshold and/or the period of time to values that will likely cause the processing platform to only generate a minimal quantity of alerts.

As shown by reference number 118, the processing platform may determine whether the control rating satisfies the threshold for the period of time (e.g., the processing platform may determine whether the control rating is greater than or equal to the threshold for the period of time). For example, when the threshold is associated with a particular level of similarity (e.g., 0.3), the processing platform may determine whether the control rating satisfies the threshold (e.g., the control rating is greater than or equal to 0.3) during the entire period of time (e.g., measured in milliseconds, second, minutes, and/or the like). When the control rating does not satisfy the threshold, or the control rating does not satisfy the threshold for the period of time, the processing platform may cause no action to be performed.

Figure 1F:
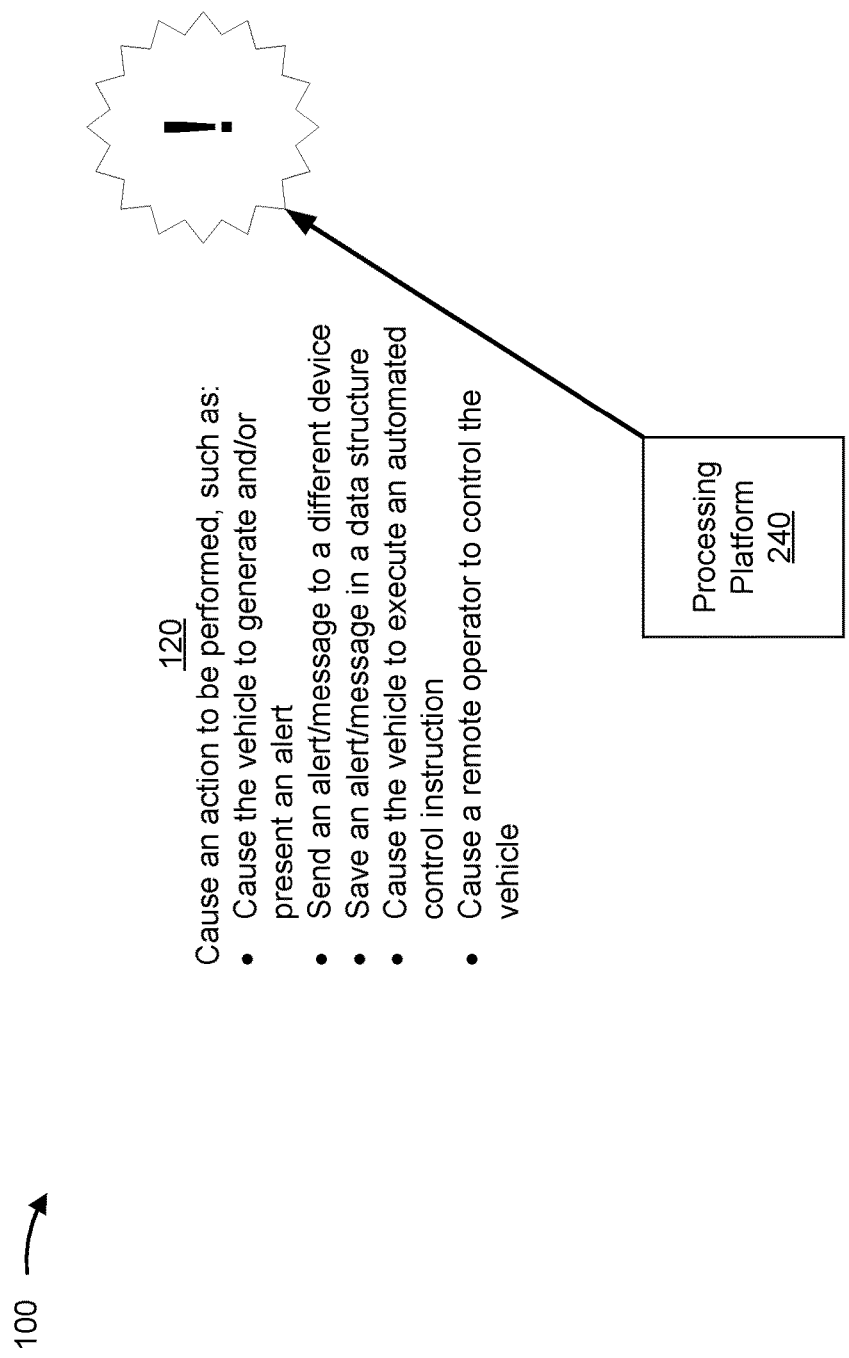

When the control rating satisfies the threshold, as shown in FIG. 1F and by reference number 120, the processing platform may cause at least one action to be performed. The processing platform may cause the at least one action to be performed based on determining that the control rating satisfies the threshold for the period of time (e.g., when the parameter and/or the automated control characteristic are sufficiently dissimilar to justify the at least one action).

For example, the processing platform may generate an alert and/or message. The processing platform may cause a display associated with the vehicle (e.g., an information screen) to display the alert and/or the message and/or may cause the alert and/or message to be stored in a data structure associated with the vehicle (e.g., memory associated with the information screen). Additionally, or alternatively, the processing platform may cause a display associated with a different device (e.g., a client device that monitors a location of the vehicle) to display the alert and/or message and/or cause the alert and/or message to be stored in a data structure associated with the different device. The different device may be accessible by a person associated with the organization that is associated with the vehicle, such as a remote operator of the vehicle, a supervisor of the organization, a manager of a fleet of vehicles that includes the vehicles, and/or the like. In some implementations, the processing platform may cause the person associated with the organization to control the vehicle via the different device.

As another example, the processing platform may generate a record based on at least one of the manual input data, the automated control information, the control rating, the threshold, or the period of time. The processing platform may cause the record to be stored in a data structure (e.g., a server device).

In another example, the processing platform may cause the vehicle to execute at least one of the one or more automated control instructions included in the automated control instructions (e.g., cause the vehicle to execute instructions to engage the brake pedal of the vehicle to slow down and/or stop the vehicle). Additionally, or alternatively, the processing platform may generate a message based on at least one of the one or more automated control instructions (e.g., a message indicating that the path for the vehicle should be modified) and may cause the vehicle to present (e.g., visually, audibly, tactilely, and/or the like) the message (e.g., via the display of the vehicle, a speaker of the vehicle, a tactile feedback device of the vehicle, and/or the like).

Some implementations described herein disclose the processing platform determining a single parameter associated with the vehicle and determining an automated control characteristic, a comparison value, a control rating, and/or the like associated with the single parameter. Further, some implementations disclose the processing platform determining whether the control rating associated with the parameter satisfies a single threshold for a single period of time, and causing at least one action based on determining that the control rating satisfies the single threshold for the single period of time. However, additional implementations contemplate the processing platform determining a plurality of parameters associated with the vehicle and determining a plurality of automated control characteristics, a plurality of comparison values, a plurality of control ratings, and/or the like respectively associated with the plurality of parameters in a similar manner as described herein in relation to FIGS. 1B-1D. Moreover, additional implementations contemplate the processing platform determining whether at least one control rating of the plurality of control ratings satisfies a respective threshold of a plurality of thresholds for a respective period of time of a plurality of periods of time in a similar manner as described herein in relation to FIG. 1E. Further, additional implementations contemplate the processing platform causing at least one action based on determining that at least one control rating satisfies the respective threshold for the respective period of time in a similar manner as described herein in relation to FIG. 1F.

In some implementations, the processing platform may send trip information concerning the sensor data, the manual input data, and the automated control information and/or one or more parameters, one or more control characteristics, one or more comparison values, one or more control ratings, and/or the like to another device, such as a fleet management platform. The trip information may be associated with a period of time (e.g., a particular interval of time, a period of time between a time when the vehicle was turned on and a time when the vehicle was turned off, a period of time when the vehicle was on a highway, and/or the like).

The fleet management platform may process the trip information to evaluate a performance of the operator of the vehicle (e.g., determine how often and to what degree the operator caused the vehicle to operate in a manner that deviated from a manner indicated by the automated control information). For example, the fleet management platform may compare the one or more automated control instructions of the automated control information and the one or more manual input instructions of the manual input data to determine a trip score (e.g., determine, for a particular parameter, a difference between the one or more automated control instructions and the one or more manual input instructions). The trip score may indicate how well the operator operated the vehicle. The trip score may have a value between 0 and 1, where a trip score closer to 0 (e.g., the trip score is less than 0.5) indicates that the operator operated the vehicle in a similar manner to a manner indicated by the automated control information, and a trip score closer to 1 (e.g., the trip score is greater than or equal to 0.5) indicates that the operator operated the vehicle in a contrary manner to the manner indicated by the automated control information. In this way, the fleet management platform may passively and/or noninvasively determine a fitness of the operator to operate the vehicle.

In some implementations, the fleet management platform may train a machine learning model to determine automated control information. The fleet management platform may train the machine learning model based on historical trip information (e.g., historical sensor data, historical manual input data, historical automated control information, one or more historical parameters, one or more historical control characteristics, one or more historical comparison values, one or more historical control ratings, and/or the like). The fleet management platform may, from time to time, send the machine learning model to the processing platform so that the processing platform can use the machine learning model to determine automated control information as described herein.

Accordingly, the fleet management platform may process the trip information and/or trip information associated with other operators, other vehicles, and/or other trips (hereinafter referred to as aggregated trip information) to update (e.g., retrain) the machine learning model. This allows the machine learning model to continually adapt to changes to real-world driving conditions, vehicle abilities, and/or the like. For example, the machine learning model may learn to adjust a preferred speed for an existing road (e.g. because of a new speed limit) based on speed information indicated by the aggregated trip information. As another example, the machine learning model may learn to adjust a preferred acceleration amount for a highway entrance (e.g., because of a change in traffic patterns) based on acceleration information indicated by the aggregated trip information. In another example, the machine learning model may learn to adjust a preferred turning radius for a particular turn (e.g., because of a closed lane) based on turn information indicated by the aggregated trip information.

Further, the fleet management platform may provide a user interface for a user, such as the operator of the vehicle or another person, to access and/or manage the trip information, the trip score, the machine learning model, and/or the like. For example, the operator of the vehicle may interact with the user interface (e.g., via the display associated with the vehicle) to obtain a trip score associated with the operator. As another example, a fleet manager may interact with the user interface (e.g., via a client device) to obtain information concerning the machine learning model and/or to select and/or adjust particular parameters (e.g., via particular fields, checkboxes, sliders, and/or the like of the user interface) to update and/or tune the machine learning model.

While some implementations described herein disclose the fleet management platform performing particular processing functions, implementations contemplate the processing platform performing the particular processing functions. For example, the processing platform may determine a trip score, may train and update a machine learning model, may provide a user interface, and/or the like in a similar manner as described herein.

As indicated above, FIGS. 1A-1F are provided as an example. Other examples may differ from what is described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown FIGS. 1A-1F.

Figure 2:
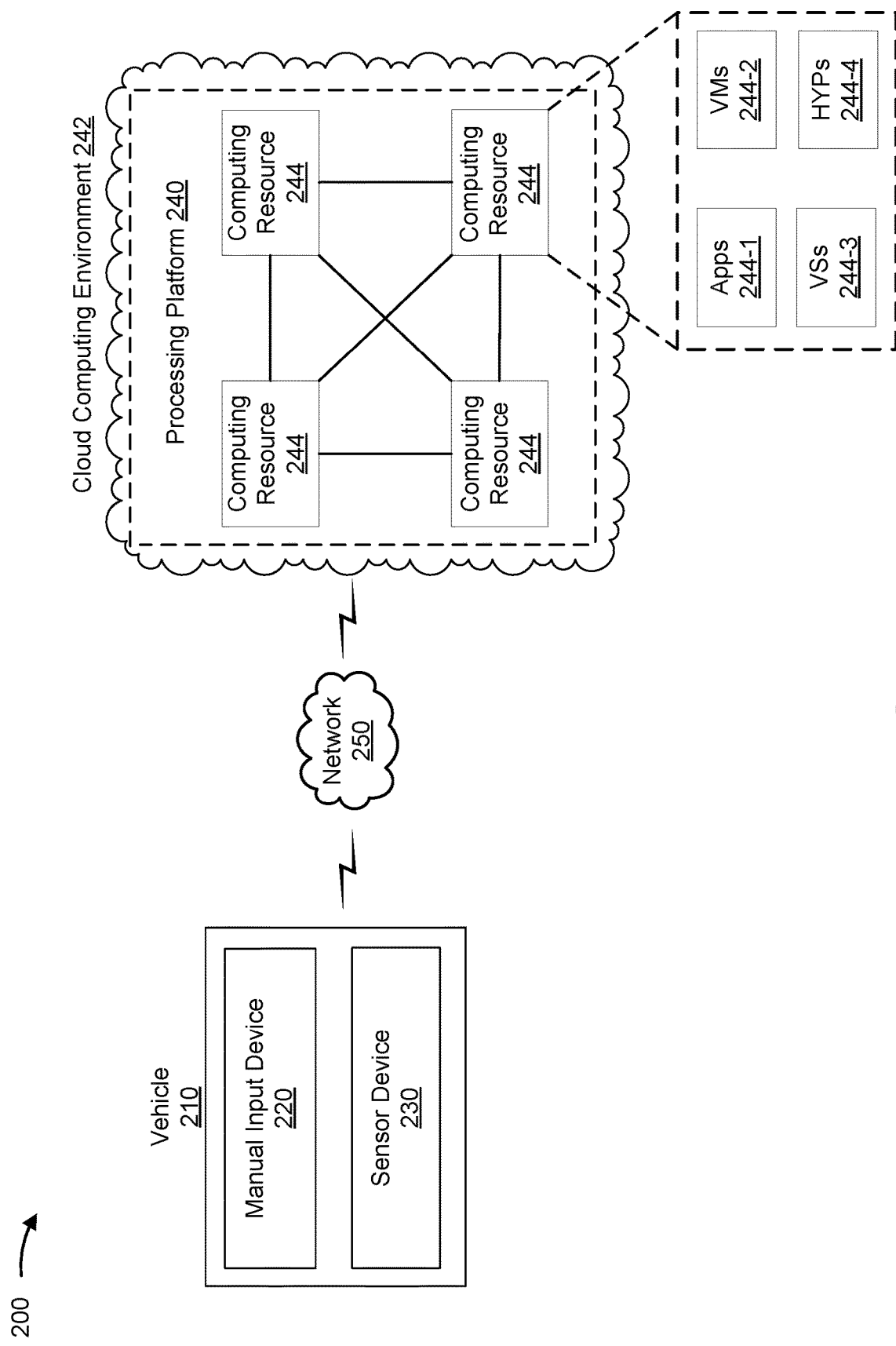
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a vehicle 210 (e.g., including one or more manual input devices 220 (referred to herein individually as "manual input device 220" and collectively as "manual input devices 220"), one or more sensor devices 230 (referred to herein individually as "sensor device 230" and collectively as "sensor devices 230"), a processing platform 240, a cloud computing environment 242, one or more computing resources 244, and a network 250. Devices of environment 200 may interconnect via wired connections, wireless connections, or a combination of wired and wireless connections.

Vehicle 210 includes one or more devices (e.g., one or more manual input devices 220, one or more sensor devices 230, processing platform 240, and/or the like) capable of obtaining data that can be used to facilitate manual operation of vehicle 210. Manual input device 220 includes one or more devices capable of generating and/or obtaining manual input data that controls operation of vehicle 210. For example, manual input device 220 may include a steering device (e.g., a steering wheel), an accelerator pedal, a brake pedal, a clutch pedal, and/or a similar device. In some implementations, an operator (e.g., a driver) of vehicle 210 may interact with manual input device 220, which may cause manual input device 220 to generate the manual input data. In some implementations, manual input device 220 may include a communication and/or computing device, such as a wireless communication device, a cellular communication device, an electronics control unit (ECU), a mobile phone (e.g., a smart phone, a radiotelephone, and/or the like), a laptop computer, a tablet computer, a handheld computer and/or a similar device that is capable of: generating and/or obtaining the manual input data, sending the manual input data to processing platform 240, controlling vehicle 210 based on the manual input data, and/or the like.

Sensor device 230 includes one or more devices capable of generating and/or obtaining sensor data. For example, sensor device 230 may include a speedometer device, a tachometer device, an accelerometer device, a radar device, a sonar device, a camera device, a light detection and ranging (lidar) device, an inertial positioning system device, a global positioning system (GPS) device, and/or the like. In some implementations, the detecting device may be mounted on, integrated into, and/or affixed to vehicle 210 (e.g., on a dashboard of vehicle 210, on a windshield of vehicle 210, in a side mirror of vehicle 210, in a head unit of vehicle 210, in a bumper of vehicle 210, in a door handle of vehicle 210, and/or the like). In some implementations sensor device 230 may include a communication and/or computing device, such as a wireless communication device, a cellular communication device, an ECU, a mobile phone (e.g., a smart phone, a radiotelephone, and/or the like), a laptop computer, a tablet computer, a handheld computer and/or a similar device that is capable of: generating and/or obtaining the sensor data, sending the sensor data to processing platform 240, and/or the like.

Processing platform 240 includes one or more devices capable of facilitating manual operation of a vehicle. In some implementations, processing platform 240 may be modular such that certain software components may be swapped in or out depending on a particular need. As such, processing platform 240 may be easily and/or quickly reconfigured for different uses. In some implementations, processing platform 240 may receive information from and/or transmit information to vehicle 210, manual input device 220, sensor device 230, and/or the like. In some implementations, processing platform 240 may include a server device (e.g., a host server, a web server, an application server, and/or the like), a data center device, or a similar device.

In some implementations, as shown, processing platform 240 can be hosted in cloud computing environment 242. Notably, while implementations described herein describe processing platform 240 as being hosted in cloud computing environment 242, in some implementations, processing platform 240 might not be cloud-based (i.e., can be implemented outside of a cloud computing environment 242) or might be partially cloud-based. Additionally, or alternatively, processing platform 240 may be mounted on, integrated into, and/or affixed to vehicle 210 (e.g., on a dashboard of vehicle 210, on a windshield of vehicle 210, in a side mirror of vehicle 210, in a head unit of vehicle 210, in a bumper of vehicle 210, in a door handle of vehicle 210, and/or the like).

Cloud computing environment 242 includes an environment that may host processing platform 240. Cloud computing environment 242 may provide computation, software, data access, storage, etc. services that do not require end-user knowledge of a physical location and configuration of system(s) and/or device(s) that host processing platform 240. As shown, cloud computing environment 242 may include a group of computing resources 244 (referred to collectively as "computing resources 244" and individually as "computing resource 244").

Computing resource 244 includes one or more personal computers, workstation computers, server devices, or another type of computation and/or communication device. In some implementations, computing resource 244 can host processing platform 240. The cloud resources can include compute instances executing in computing resource 244, storage devices provided in computing resource 244, data transfer devices provided by computing resource 244, etc. In some implementations, computing resource 244 can communicate with other computing resources 244 via wired connections, wireless connections, or a combination of wired and wireless connections.

As further shown in FIG. 2, computing resource 244 can include a group of cloud resources, such as one or more applications ("APPs") 244-1, one or more virtual machines ("VMs") 244-2, virtualized storage ("VSs") 244-3, one or more hypervisors ("HYPs") 244-4, or the like.

Application 244-1 includes one or more software applications that can be provided to or accessed by vehicle 210, manual input device 220, sensor device 230, and/or processing platform 240. Application 244-1 can eliminate a need to install and execute the software applications on vehicle 210, manual input device 220, sensor device 230, and/or processing platform 240. For example, application 244-1 can include software associated with processing platform 240 and/or any other software capable of being provided via cloud computing environment 242. In some implementations, one application 244-1 can send/receive information to/from one or more other applications 244-1, via virtual machine 244-2.

Virtual machine 244-2 includes a software implementation of a machine (e.g., a computer) that executes programs like a physical machine. Virtual machine 244-2 can be either a system virtual machine or a process virtual machine, depending upon use and degree of correspondence to any real machine by virtual machine 244-2. A system virtual machine can provide a complete system platform that supports execution of a complete operating system. A process virtual machine can execute a single program, and can support a single process. In some implementations, virtual machine 244-2 can execute on behalf of a user, and can manage infrastructure of cloud computing environment 242, such as data management, synchronization, or long-duration data transfers.

Virtualized storage 244-3 includes one or more storage systems and/or one or more devices that use virtualization techniques within the storage systems or devices of computing resource 244. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 244-4 provides hardware virtualization techniques that allow multiple operating systems (e.g., "guest operating systems") to execute concurrently on a host computer, such as computing resource 244. Hypervisor 244-4 can present a virtual operating platform to the guest operating systems, and can manage the execution of the guest operating systems. Multiple instances of a variety of operating systems can share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network (e.g., a Bluetooth mesh network, a ZigBee mesh network), a low-power, wide-area network (e.g., a narrow band internet of things (NBIoT) network, a Sigfox network, a LoRa network, an LTE-M network, an LTE Cat-M1 network, an LTE Cat-M2 network and/or the like), or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
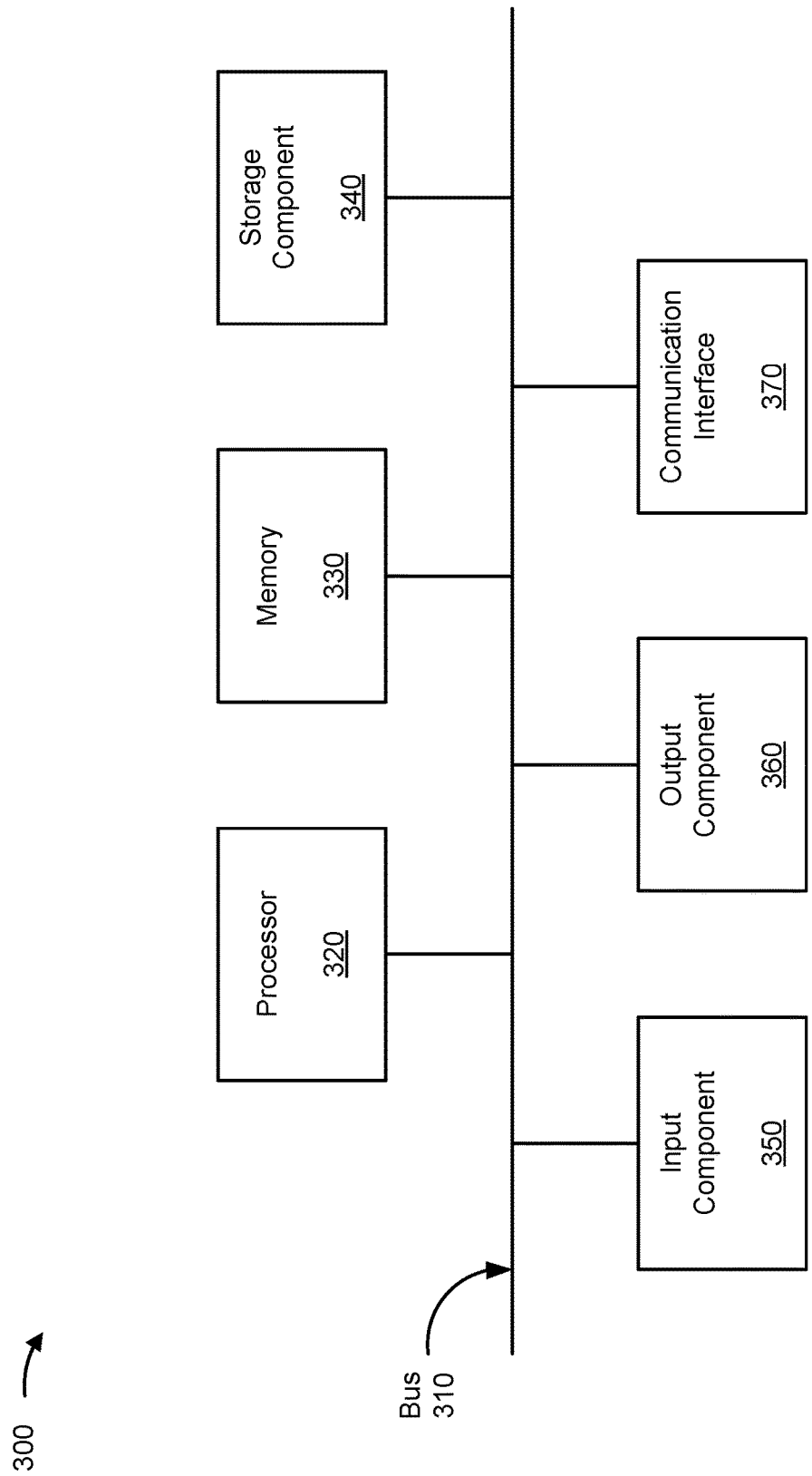
FIG. 3 is a diagram of example components of one or more devices of FIG. 2.

FIG. 3 is a diagram of example components of a device 300. Device 300 may correspond to vehicle 210, manual input device 220, sensor device 230, and/or processing platform 240. In some implementations vehicle 210, manual input device 220, sensor device 230, and/or processing platform 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
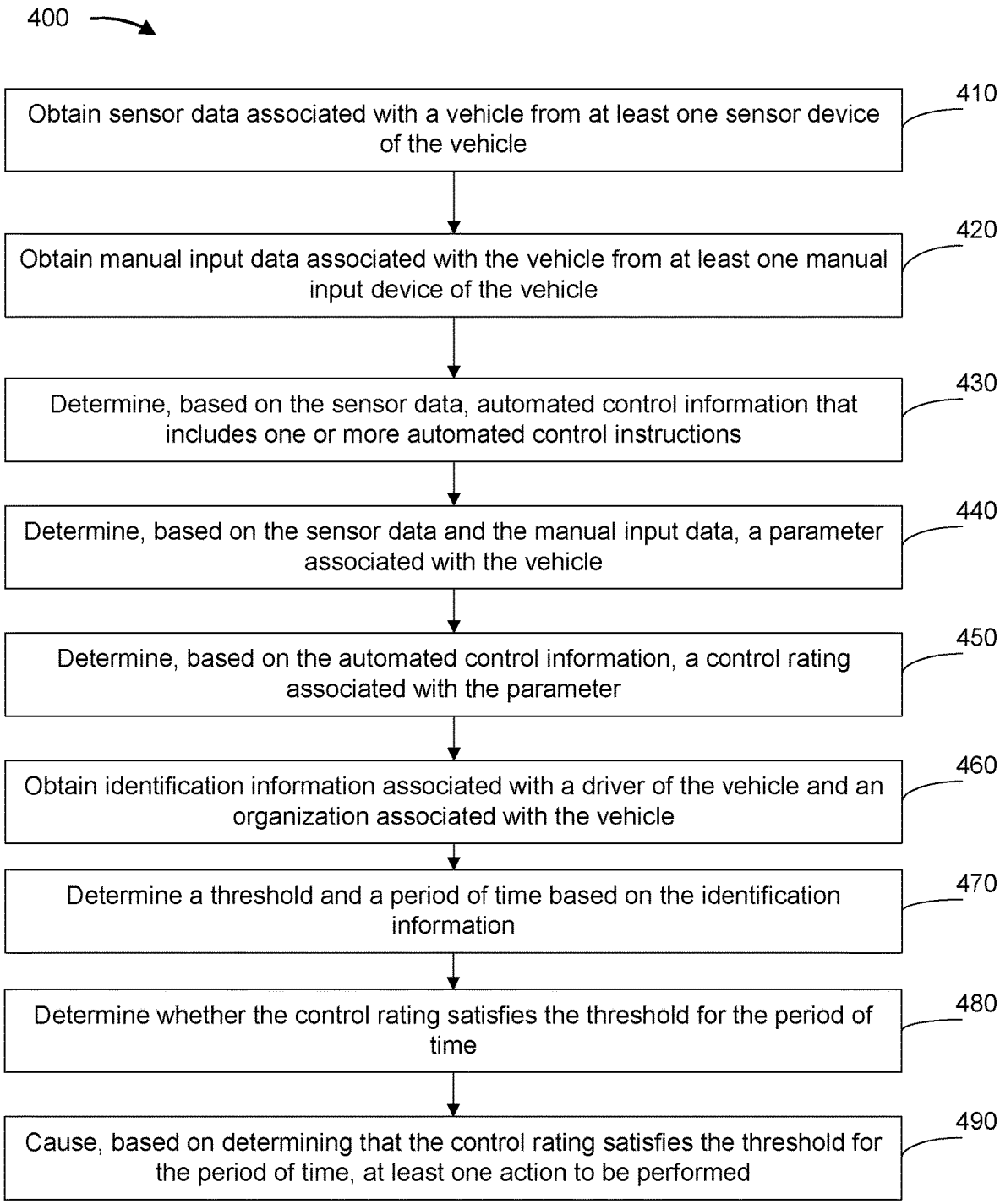
FIG. 4 is a flow chart of an example process for facilitating manual operation of a vehicle.

FIG. 4 is a flow chart of an example process 400 for facilitating manual operation of a vehicle. In some implementations, one or more process blocks of FIG. 4 may be performed by a processing platform (e.g., processing platform 240). In some implementations, one or more process blocks of FIG. 4 may be performed by another device or a group of devices separate from or including the device, such as a vehicle (e.g., vehicle 210), a manual input device (e.g., manual input device 220), a sensor device (e.g., sensor device 230), and/or the like.

As shown in FIG. 4, process 400 may include obtaining sensor data associated with a vehicle from at least one sensor device of the vehicle (block 410). For example, the processing platform (e.g., using processor 320, memory 330, storage component 340, input component 350, output component 360, communication interface 370 and/or the like) may obtain sensor data associated with a vehicle from at least one sensor device of the vehicle, as described above. The sensor device may be, e.g., a speedometer device, a tachometer device, an accelerometer device, a radar device, a sonar device, a camera device, a lidar device, an inertial positioning system device, or a global positioning system device.

As further shown in FIG. 4, process 400 may include obtaining manual input data associated with the vehicle from at least one manual input device of the vehicle (block 420). For example, the processing platform (e.g., using processor 320, memory 330, storage component 340, input component 350, output component 360, communication interface 370 and/or the like) may obtain manual input data associated with the vehicle from at least one manual input device of the vehicle. The manual input device may be, e.g., a steering device of the vehicle, an accelerator pedal of the vehicle, a brake pedal of the vehicle, or a clutch pedal of the vehicle. The manual input data may include one or more manual input instructions.

As further shown in FIG. 4, process 400 may include determining, based on the sensor data, automated control information that includes one or more automated control instructions (block 430). For example, the processing platform (e.g., using processor 320, memory 330, storage component 340, input component 350, output component 360, communication interface 370 and/or the like) may determine, based on the sensor data, automated control information that includes one or more automated control instructions, as described above. The processing platform may process the sensor data to determine a speed of the vehicle, an acceleration or deceleration of the vehicle, a path of the vehicle, a position of the vehicle with respect to a driving lane, and/or the like, and may determine the automated control information based on the speed of the vehicle, the acceleration or deceleration of the vehicle, the path of the vehicle, the position of the vehicle, and/or the like determined by the processing platform.

As further shown in FIG. 4, process 400 may include determining, based on the sensor data and the manual input data, a parameter associated with the vehicle (block 440). For example, the processing platform (e.g., using processor 320, memory 330, storage component 340, input component 350, output component 360, communication interface 370 and/or the like) may determine, based on the sensor data and the manual input data, a parameter associated with the vehicle, as described above. The parameter may be a speed of the vehicle, an acceleration or deceleration of the vehicle, a path of the vehicle, a position of the vehicle with respect to a driving lane, environmental information associated with the vehicle, such as a distance from the vehicle to an object (e.g., another vehicle, a person, a median, a building, a sign, and/or the like), a direction of a steering device of the vehicle, a status of an accelerator pedal of the vehicle, a status of a brake pedal of the vehicle, a status of a clutch pedal of the vehicle, and/or the like.

As further shown in FIG. 4, process 400 may include determining, based on the automated control information, a control rating associated with the parameter (block 450). For example, the processing platform (e.g., using processor 320, memory 330, storage component 340, input component 350, output component 360, communication interface 370 and/or the like) may determine, based on the automated control information, a control rating associated with the parameter, as described above. The processing platform may process the automated control information to determine an automated control characteristic that corresponds to the parameter; may determine a comparison value based on the automated control characteristic and the parameter; and may determine the control rating based on the comparison value. Additionally, or alternatively, the processing platform may determine one or more particular manual input instructions, of the one or more manual input instructions, associated with the parameter; may determine one or more particular automated control instructions, of the one or more automated control instructions, associated with the parameter; may determine a comparison value associated with the parameter based on the one or more particular automated control instructions and the one or more particular manual input instructions; and may determine the control rating based on the comparison value.

As further shown in FIG. 4, process 400 may include obtaining identification information associated with a driver of the vehicle and an organization associated with the vehicle (block 460). For example, the processing platform (e.g., using processor 320, memory 330, storage component 340, input component 350, output component 360, communication interface 370 and/or the like) may obtain identification information associated with a driver of the vehicle and an organization associated with the vehicle, as described above. The processing platform may identify information concerning a driving preference of the driver and/or a driving preference of the organization.

As further shown in FIG. 4, process 400 may include determining a threshold and a period of time based on the identification information (block 470). For example, the processing platform (e.g., using processor 320, memory 330, storage component 340, input component 350, output component 360, communication interface 370 and/or the like) may determine a threshold and a period of time based on the identification information, as described above. Additionally, or alternatively, the processing platform may determine the threshold and the period of time based on at least one of information concerning a driving preference of the driver and information concerning a driving preference of the organization.

As further shown in FIG. 4, process 400 may include determining whether the control rating satisfies the threshold for the period of time (block 480). For example, the processing platform (e.g., using processor 320, memory 330, storage component 340, input component 350, output component 360, communication interface 370 and/or the like) may determine whether the control rating satisfies the threshold for the period of time, as described above. In some implementations, the processing platform may determine whether the control rating is greater than or equal to the threshold for the period of time.

As further shown in FIG. 4, process 400 may include causing, based on determining that the control rating satisfies the threshold for the period of time, at least one action to be performed (block 490). For example, the processing platform (e.g., using processor 320, memory 330, storage component 340, input component 350, output component 360, communication interface 370 and/or the like) may cause, based on determining that the control rating satisfies the threshold for the period of time, at least one action to be performed, as described above. The processing platform may generate an alert. The processing platform may cause a display associated with the vehicle to display the alert and/or may cause the alert to be stored in a data structure associated with the vehicle. Additionally, or alternatively, the processing platform may cause a display associated with a different device to display the alert and/or cause the alert to be stored in a data structure associated with the different device. The processing platform may generate a record based on at least one of the manual input data, the automated control information, the control rating, the threshold, or the period of time and may cause the record to be stored in a data structure.

In some implementations, the processing platform may cause the vehicle to execute at least one of the one or more automated control instructions included in the automated control instructions. Additionally, or alternatively, the processing platform may generate a message based on at least one of the one or more automated control instructions and may cause the vehicle to present the message.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining, by a device, real-time sensor data associated with a vehicle and real-time manual input data related to one or more manual input devices associated with the vehicle,
        wherein the real-time sensor data is generated based on the vehicle being manually controlled by the one or more manual input devices;
    determining, by the device, based on a machine learning model that is trained with historical trip information, and based on the real-time sensor data, automated control information that includes one or more control instructions associated with automatically controlling the vehicle;
    determining, by the device and based on the real-time sensor data and the real-time manual input data, a parameter associated with the vehicle;
    determining, by the device and based on the automated control information, an automated control characteristic, associated with the one or more control instructions, indicating how the vehicle would behave if automatically controlled;
    determining, by the device, a difference between a first value associated with the automated control characteristic and a second value associated with the parameter;
    obtaining, by the device, first identification information associated with a driver of the vehicle and second identification information associated with an organization associated with the vehicle;
    determining, by the device and based on the first identification information and the second identification information, a threshold, associated with the difference between the first value and the second value, and a period of time;
    determining, by the device, whether the difference between the first value and the second value satisfies the threshold for the period of time; and
    causing, by the device and based on determining that the difference between the first value and the second value satisfies the threshold for the period of time, at least one action to be performed,
        wherein the at least one action comprises executing the one or more control instructions that affect the one or more manual input devices.

2. The method of claim 1, wherein causing the at least one action to be performed comprises:
  generating an alert;
  causing a display associated with the vehicle to display the alert; and
  causing the alert to be stored in a data structure associated with the vehicle.

3. The method of claim 1, wherein determining the automated control information comprises:
  determining a speed of the vehicle based on the real-time sensor data;
  determining an acceleration or deceleration of the vehicle based on the real-time sensor data;
  determining a path of the vehicle based on the real-time sensor data;
  determining a position of the vehicle with respect to a driving lane based on the real-time sensor data; and
  determining the automated control information based on at least one of the speed of the vehicle, the acceleration or deceleration of the vehicle, the path of the vehicle, or the position of the vehicle.

4. The method of claim 1, wherein the parameter is associated with:
  a speed of the vehicle;
  an acceleration of the vehicle;
  a deceleration of the vehicle;
  a direction of a steering device of the vehicle;
  a status of an accelerator pedal of the vehicle;
  a status of a brake pedal of the vehicle;
  a status of a clutch pedal of the vehicle;
  a path of the vehicle;
  environmental information associated with the vehicle; or
  a position of the vehicle with respect to a driving lane.

5. The method of claim 1, wherein determining whether the difference between the first value and the second value satisfies the threshold for the period of time comprises:
  determining whether the difference between the first value and the second value is greater than or equal to the threshold for the period of time.

6. The method of claim 1, wherein causing the at least one action to be performed comprises:
  generating an alert;
  causing a display associated with a different device to display the alert; and
  causing a remote user associated with the different device to control the vehicle.

7. The method of claim 1, wherein the at least one action comprises:
  generating, based on the one or more control instructions, a message; and
  presenting the message via a tactile feedback device associated with the vehicle.

8. A device, comprising:
  one or more memories; and
  one or more processors communicatively coupled to the one or more memories, to:
    obtain real-time sensor data associated with a vehicle from at least one sensor device of the vehicle,
      wherein the real-time sensor data is generated based on the vehicle being manually controlled by at least one manual input device associated with the vehicle;
    obtain real-time manual input data associated with the vehicle from the at least one manual input device;
    determine, based on a machine learning model that is trained with historical trip information, and based on the real-time sensor data, automated control information that includes one or more control instructions associated with automatically controlling the vehicle;
    determine, based on the real-time sensor data and the real-time manual input data, a parameter associated with the vehicle;
    determine, based on the automated control information, an automated control characteristic, associated with the one or more control instructions, indicating how the vehicle would behave if automatically controlled;
    determine a difference between a first value associated with the automated control characteristic and a second value associated with the parameter;
    obtain first identification information associated with a driver of the vehicle and second identification information associated with an organization associated with the vehicle:
    determine, based on the first identification information and the second identification information, a threshold, associated with the difference between the first value and the second value, and a period of time;
    determine whether the difference between the first value and the second value satisfies the threshold for the period of time; and
    cause, based on determining that the difference between the first value and the second value satisfies the threshold for the period of time, at least one action to be performed,
      wherein the at least one action comprises executing the one or more control instructions that affect the at least one manual input device.

9. The device of claim 8, wherein the at least one sensor device is associated with:
  a speedometer device;
  a tachometer device;
  an accelerometer device;
  a radar device;
  a sonar device;
  a camera device;
  a light detection and ranging (lidar) device;
  an inertial positioning system device; or
  a global positioning system device.

10. The device of claim 8, wherein the at least one manual input device includes:
  a steering device of the vehicle;
  an accelerator pedal of the vehicle;
  a brake pedal of the vehicle; or
  a clutch pedal of the vehicle.

11. The device of claim 8, wherein the one or more processors, when causing the at least one action to be performed, are to:
  cause a display associated with the vehicle to display an alert.

12. The device of claim 8, wherein the one or more processors, when causing the at least one action to be performed, are to:
  generate an alert;
  cause a display associated with a different device to display the alert; and
  cause the alert to be stored in a data structure associated with the different device.

13. The device of claim 8, wherein the one or more processors, when causing the at least one action to be performed, are to:
  generate an alert;

cause a display associated with a different device to display the alert; and causing a remote user associated with the different device to control the vehicle.

14. The device of claim 8, wherein the one or more processors are to:

determine a preference associated with a quantity of alerts; and determine, based on the preference, at least one of the threshold or the period of time.

15. The device of claim 8, wherein the at least one action comprises:

generating, based on the one or more control instructions, a message; and presenting the message via a tactile feedback device associated with the vehicle.

16. A non-transitory computer-readable medium storing instructions, the instructions comprising:

one or more instructions that, when executed by one or more processors, cause the one or more processors to:

obtain real-time sensor data associated with a vehicle from at least one sensor device of the vehicle, wherein the real-time sensor data is generated based on the vehicle being manually controlled by at least one manual input device associated with the vehicle;

obtain real-time manual input data associated with the vehicle from the at least one manual input device;

wherein the real-time manual input data includes one or more manual input instructions;

determine, based on a machine learning model that is trained with historical trip information, and based on the real-time sensor data, automated control information that includes one or more control instructions associated with automatically controlling the vehicle;

determine, based on the real-time sensor data and the real-time manual input data, a parameter associated with the vehicle;

determine, based on the automated control information, an automated control characteristic, associated with the one or more control instructions, indicating how the vehicle would behave if automatically controlled;

determine a difference between a first value associated with the automated control characteristic and a second value associated with the parameter;

obtain first identification information associated with a driver of the vehicle and a second identification information associated with an organization associated with the vehicle;

determine, based on the first identification information and the second identification information, a threshold, associated with the difference between the first value and the second value, and a period of time;

determine whether the difference between the first value and the second value satisfies the threshold for the period of time; and cause, based on determining that the control rating satisfies the threshold for the period of time, at least one action to be performed, wherein the at least one action comprises executing the one or more control instructions that affect the at least one manual input device.

17. The non-transitory computer-readable medium of claim 16, wherein the one or more instructions, that cause the one or more processors to determine the threshold and the period of time, cause the one or more processors to:

identify information concerning a driving preference of the driver;

identify information concerning a driving preference of the organization; and determine the threshold and the period of time based on at least one of the information concerning the driving preference of the driver and the information concerning the driving preference of the organization.

18. The non-transitory computer-readable medium of claim 16, wherein the one or more instructions, that cause the one or more processors to cause the at least one action to be performed, cause the one or more processors to:

generate a record based on at least one of the real-time manual input data, the automated control information, the threshold, or the period of time; and cause the record to be stored in a data structure.

19. The non-transitory computer-readable medium of claim 16, wherein the one or more instructions, that cause the one or more processors to cause the at least one action to be performed, cause the one or more processors to:

generate a message based on at least one of the one or more automated control instructions; and cause the vehicle to present the message.

20. The non-transitory computer-readable medium of claim 16, wherein executing the at least one action comprises:

generating, based on the one or more control instructions, a message; and presenting the message via a tactile feedback device associated with the vehicle.

* * * * *